Figure 1:
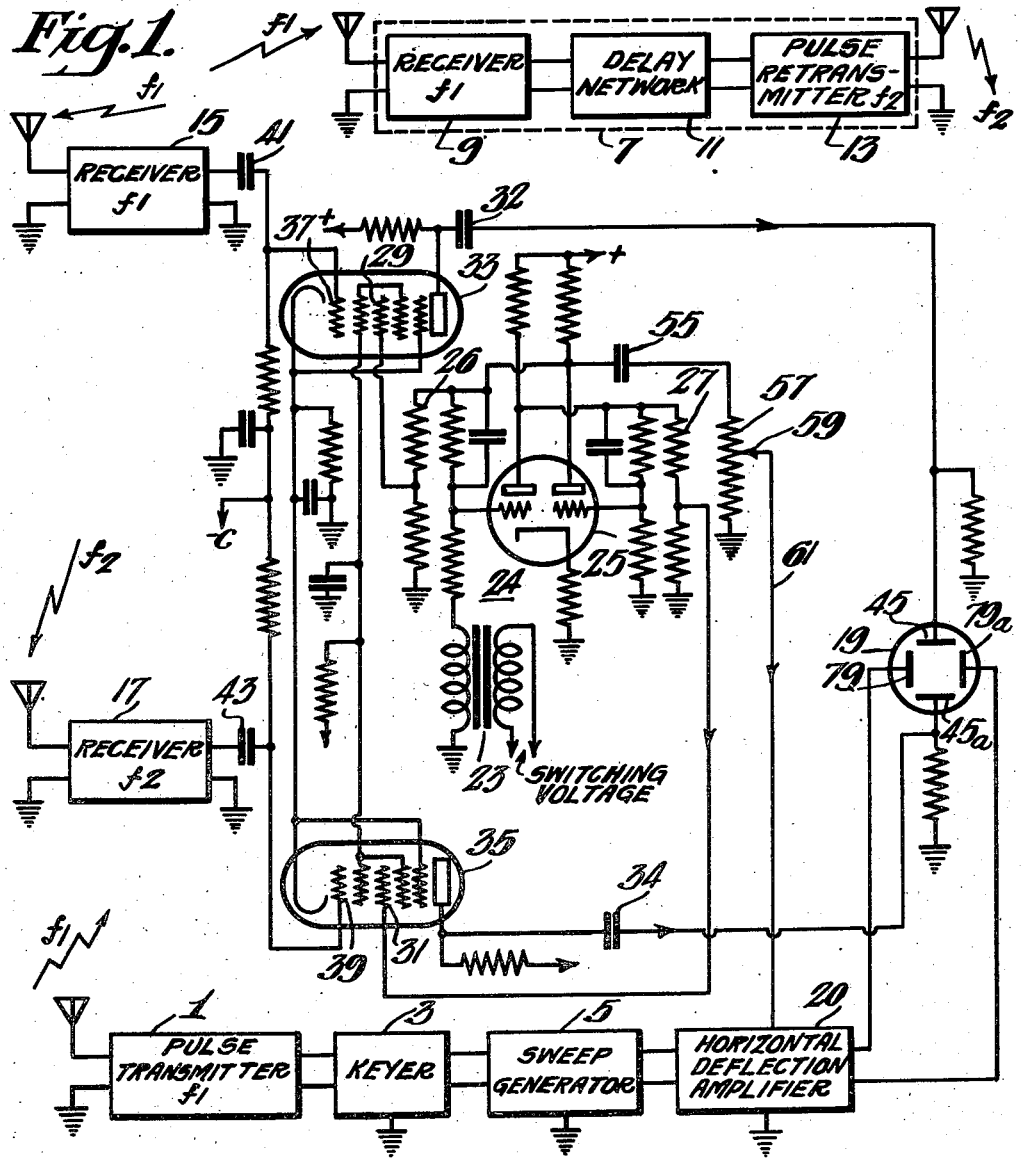

May 24, 1949.  A. A. JOYNER  2,471,373
PULSE-ECHO RECOGNITION SYSTEM
Filed Sept. 30, 1942  2 Sheets-Sheet 1

Inventor
Archibald A. Joyner
By
C. D. Puska
Attorney

May 24, 1949.  A. A. JOYNER  2,471,373
PULSE-ECHO RECOGNITION SYSTEM
Filed Sept. 30, 1942  2 Sheets-Sheet 2
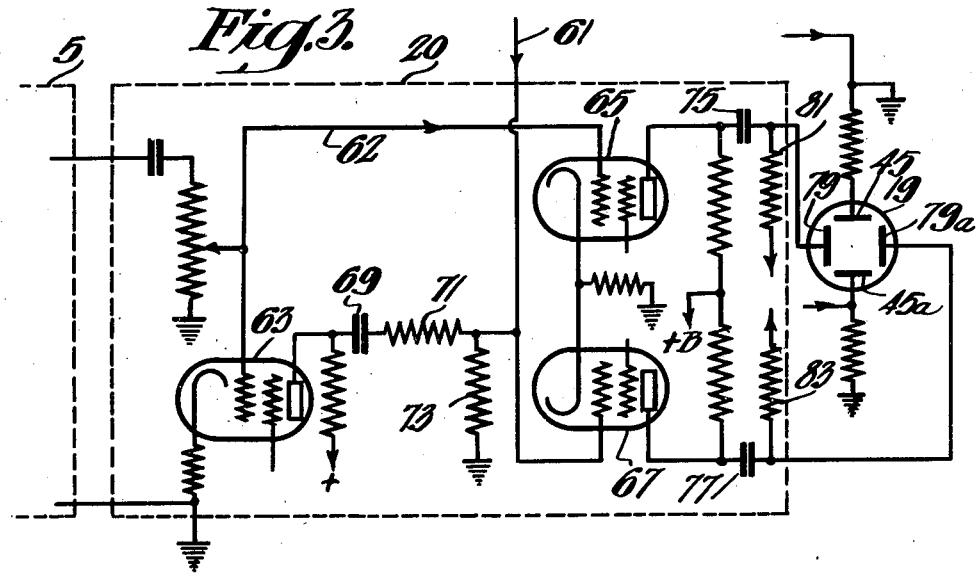
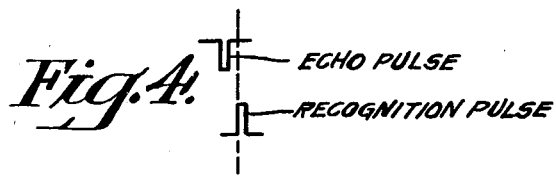
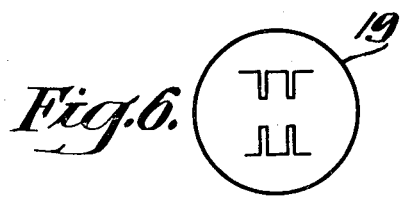
Inventor
Archibald A. Joyner
By
C. D. Tuska
Attorney Patented May 24, 1949

2,471,373

UNITED STATES PATENT OFFICE 2,471,373

PULSE ECHO RECOGNITION SYSTEM

Archibald A. Joyner, Merchantville, N. J., assignor to Radio Corporation of America, a corporation of Delaware Application September 30, 1942, Serial No. 460,291

4 Claims. (Cl. 343—13)

This invention relates to pulse echo recognition systems and particularly to an improvement in pulse echo systems wherein recognition pulses and echo pulses may be separately indicated and compared.

In a pulse echo system pulses of energy are radiated toward visible and invisible aircraft or surface craft which may be operated by friendly or unfriendly hands. The pulses are reflected by such craft and received at or near the point of radiation. The received pulses are indicated by suitable means such as a cathode ray tube provided with means for deflecting the ray as a signal function and with additional means for deflecting the ray in synchronism with the radiation of pulses. The indicator may be calibrated to indicate the pulse propagation time and hence the range or distance of the pulse reflecting objects.

Since it is normally impossible to determine from an echo signal itself if the reflected signal is from a friendly or unfriendly craft, it is desirable to provide some means for challenging and recognizing the craft. There has previously been proposed a pulse echo system for indicating on a single cathode ray tube echo signals and recognition signals whereby a plurality of echo signals may be compared to one or more identifying signals.

In this previously proposed system the recognition signals may be delayed slightly with respect to the echo signals in order to obtain satisfactory retransmission from the craft. As a result, the recognition and echo signals do not fall one directly below the other on the cathode ray tube screen and there may be confusion in identifying corresponding signals.

It is therefore one object of the present invention to provide an improved method of and means for causing the recognition and echo pulses in a system of the above-described type to appear in alignment on an indicator screen. A further object of the invention is to provide an improved pulse echo recognition system. A still further object of the invention is to provide an improved method of and means for determining the time delay of electrical signals.

In one preferred embodiment of the invention, as applied to a pulse echo recognition system wherein the recognition pulses and echo pulses appear on axes displaced with respect to each other, the sweep or timing voltage has rectangular voltage pulses of the proper amplitude added thereto during each interval that the recognition pulse axis is displaced. By changing the amplitude of these rectangular pulses, the displacement and position of the recognition pulses along their time axis may be controlled. Thus the recognition pulses from a number of aircraft, for example, may be positioned on an indicator screen directly underneath the echo pulses reflected from the corresponding aircraft.

Figure 2:
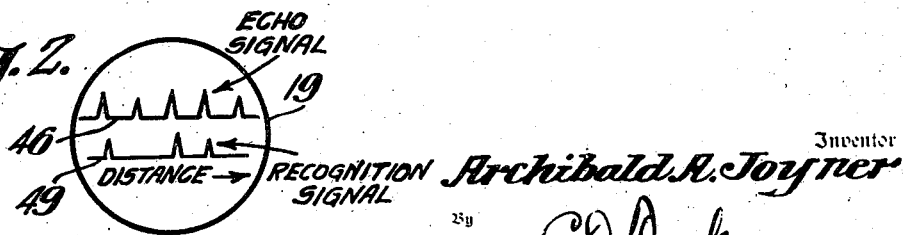

The invention will be described by referring to the accompanying drawing in which Figure 1 is a block and schematic diagram of one embodiment of the invention; Figure 2 is an illustration of the type of echo and recognition signal indications that are obtained without employing my invention; Figure 3 is a circuit diagram of a portion of the system of Fig. 1; Figure 4 is a graph showing incoming echo and recognition pulses, and Figs. 5 and 6 are diagrams that are referred to in explaining the invention. Similar reference characters will be applied to similar elements in the drawing.

Referring to Fig. 1, a pulse transmitter 1, operated by a keyer 3 which is synchronized with a sweep generator 5, radiates pulses of carrier frequency ($f1$) toward an aircraft or wave reflecting object represented by the dash line box 7. If the aircraft is operated by friendly hands, it is provided with a suitable reflector, or recognition transmitter, preferably operated in accordance with a prearranged secret code. The recognition transmitter may include a pulse receiver 9 which is connected through a delay network 11 to a pulse re-transmitter 13. The re-transmitter is preferably operated at a different frequency ($f2$) from the frequency ($f1$) of the original pulse transmitter.

The echo pulses from the craft are received on a pulse echo receiver 15 which is tuned to the pulse carrier frequency ($f1$). The retransmitted or recognition pulses are received on a re-transmission pulse receiver 17 which is tuned to the re-transmission pulse carrier frequency ($f2$). The outputs from the two receivers 15 and 17 are applied (as hereinafter described) to a cathode ray tube 19 to which the sweep circuit generator voltages are also applied through a horizontal or sweep deflection amplifier 20.

The method of indicating the pulse echo signals and the recognition signals is as follows: The sweep voltages are applied to deflect the cathode ray along a horizontal distance scale. The output voltages from the receivers 15 and 17 are applied alternately to the vertical deflecting electrodes. A bias voltage is applied to the vertical deflecting plates in synchronism with the alternate output signal voltages to raise the horizontal distance scale for the echo signals and to lower the horizontal distance scale for the recognition signals. According to the present invention a bias is similarly applied to the horizontal deflecting plates to obtain the desired horizontal shift of the echo and recognition signals with respect to each other.

One circuit arrangement for applying the several voltages is as follows: A switching voltage is applied through a transformer 23 to a square wave generator or trigger circuit 24 of the Eccles-Jordan type. Trigger circuit 24 comprises a thermionic tube 25 containing a pair of triode sections. The input and output circuits of the trigger circuit 24 are connected together in the usual manner so that first one, then the other tube passes anode current to form a voltage of square wave form.

The signal control grids 37, 39 of a pair of amplifier tubes 33 and 35 are connected through blocking capacitors 41, 43 to the output circuits of the reflected pulse receiver 15 and the pulse receiver 17, respectively. The anodes of the amplifiers 33, 35 are connected through blocking capacitors 32 and 34 to the vertical deflecting elements 45 and 45a of cathode ray tube 19. The anodes of the tube 25 are connected respectively through voltage divider resistors 26 and 27 to the grids 29, 31 of the amplifier tubes 33, 35. A bias voltage of square wave form is thus applied from the circuit 24 through the tubes 33, 35 to the vertical deflecting electrodes 45 and 45a of the cathode ray tube 19.

Another bias voltage of square wave form is applied through a capacitor 55 and a conductor 61 to the horizontal deflection amplifier 20.

The pulse echo system proper transmits pulses which are reflected by the aircraft 7 and are received by the receiver 15. These echo pulses deflect the cathode ray vertically to produce echo pulse indications as shown in Fig. 2 during the time the trigger circuit 24 unblocks the amplifier 33. The square wave generator 24 simultaneously applies a bias to the deflecting plates 45 and 45a through the tubes 33 and 35 to move the time trace or axis 46 upwardly. The retransmitter operates after a slight delay (which prevents overloading the receiver 9 at the instant of reception) to transmit a recognition pulse. The re-transmission receiver 17 responds to the recognition signal which is applied to the cathode ray tube 19 through the amplifier 35 at the instant the trigger circuit 24 unblocks the amplifier 35 and biases the cathode ray downwardly so that it moves along the lower time trace or axis 49.

It should be understood that the pulse rate is inversely proportional to the distances to be measured. The switching rate, at which the pulse echo signals and the recognition signals are applied, is preferably higher than the flicker rate.

Instead of using two receivers, a single receiver of the superheterodyne type may be used. The frequency of the oscillator of the superheterodyne may be shifted by reactance tubes controlled by the square wave voltages or two oscillators may be alternately keyed to make the receiver responsive to first one frequency ($f1$) then the other frequency ($f2$).

If the delay in the re-transmitter system is appreciable, the recognition signals will appear shifted slightly to the right as shown in Fig. 2. Provided similar delays are used in all the recognition systems, the shifting of the recognition signals may be overcome by including a phase shifter in either the echo pulse receiver or the echo transmitter (if a separate echo transmitter is used) so that the trace of each received pulse signal may be compared with the trace of the recognition signal immediately below.

However, it is preferred to utilize the present invention and overcome this shift of the recognition signals by mixing rectangular voltage pulses with the sweep voltage to produce horizontal displacement of the time axis, the amount of the displacement depending upon the amplitude of said pulses. The said pulses may be obtained from the trigger circuit 24 as shown in Fig. 1 where part of the square wave output is supplied from an anode of tube 25 through the blocking capacitor 55 to an amplitude control resistor 57 grounded at its lower end. A variable tap 59 on resistor 57 connects to the conductor 61 supplying the rectangular pulses to the amplifier 20 where they are added algebraically to the sweep voltages.

Fig. 3 shows the sweep deflection amplifier in more detail, this particular circuit being illustrated merely by way of example. A sawtooth voltage wave from the sweep generator 5 is applied over a conductor 62 and through a polarity reversing amplifier 63 to the amplifier tubes 65 and 67, respectively. A blocking capacitor and voltage divider resistors are indicated at 69, 71 and 73, respectively. The amplified sawtooth voltage is applied in push-pull relation through blocking capacitors 75 and 77 to the horizontal or sweep deflecting plates 79 and 79a of the cathode ray tube 19. A centering voltage may be applied to the plates 79 and 79a through resistors 81 and 83.

The square wave voltage that is supplied over conductor 61 for shifting the pulse indications to the right or to the left on the time or sweep axis may be applied to the control grid of tube 67. Thus, during the positive half cycle of the square wave the echo signal is shifted along the time axis 46 slightly to the right and during the negative half cycle the recognition pulses are shifted along the time axis 49 slightly to the left. The amount of shift is determined by the setting of the amplitude conrol tap 59 (Fig. 1) whereby the recognition pulses on axis 49 may be brought directly underneath the echo pulses on the axis 46. This action is illustrated in Figs. 5 and 6 where Fig. 5 shows echo and recognition pulses as they appear on the cathode ray tube screen before the square wave delay correction voltage has been added, assuming the received recognition pulses have been delayed with respect to the echo pulses as indicated in Fig. 4. The addition of the square wave to the horizontal deflection sawtooth wave aligns the echo and recognition pulses as shown in Fig. 6 when the square wave is adjusted to the proper amplitude.

My invention may be utilized, if desired, generally for the purpose of measuring the time delay between electrical pulses or other signals. For example, referring to Fig. 1 the adjustable tap 59 may be provided with an index member or pointer and an associated scale that is calibrated in time delay units. Since a certain amplitude adjustment of the square wave shifts the two signals a definite amount with respect to each other, the scale reading gives the delay between pulses if the two signals have been brought into alignment or if they have been superimposed in case the two time axes are not displaced. A similar arrangement may be utilized in a recognition system to make more certain that recognition signals have not been transmitted from an enemy aircraft. The amount of delay provided by the delay network 11 in the aircraft apparatus may be made adjustable so that the delay has different predetermined values at prescribed intervals during the day. Then even if the enemy learns the code (but not the delay setting schedule) and responds to a challenge, it will be known that it is an enemy aircraft because the time delay of the recognition signals will be wrong.

I claim as my invention:

1. The method of determining the time delay between two electrical pulses, said method comprising producing an electron beam, deflecting said beam successively along a time axis with the duration of each sweep along the time axis long compared with the duration of each of said pulses, modulating said beam by one of said pulses during one deflection to produce an indication and by the other of said pulses during a succeeding deflection to produce a second indication, shifting the beam deflection in a certain direction along its time axis during the time that the beam is modulated by at least one of said signals and by an amount such as to obtain coincidence of said indications on said time axis whereby the amount of said shift indicates the amount of said time delay.

2. The method of determining the time delay between groups of electrical pulses, said method comprising producing an electron beam, deflecting said beam successively along a time axis with the duration of each sweep along the time axis long compared with the duration of each of said pulses, modulating said beam by one group of said pulses during one deflection along the time axis and by another group of said pulses during a succeeding deflection along the time axis, shifting the beam deflection in one direction along its time axis during the time that the beam is being modulated by one group of said pulses only, and shifting the beam deflection in the opposite direction along its time axis during the time that the beam is being modulated by the other group of said pulses only, until said shift brings the pulse indications of said groups of pulses into coincidence on said time axis.

3. In combination, a cathode ray tube having a screen and means for directing a cathode beam against said screen, means for deflecting said beam along a time axis, means for periodically displacing said time axis, a plurality of signal sources, means for modulating said beam by one signal source while said deflection is along one time axis position to produce signal marks on the screen, means for modulating said beam by a different signal source while said deflection is along a different time axis position to produce other signal marks on the screen, and means for displacing said first signal marks and said other signal marks with respect to each other in the direction of their time axes.

4. A pulse echo and pulse recognition system including means for radiating pulses of energy, means for receiving said radiated pulses after reflection from a craft remote from said receiving means and subject to challenge, cathode ray tube means connected to said receiving means for indicating along a time axis said received reflected pulses as a function of the distance of the reflecting craft, means on said remote craft responsive to said radiated pulses for delaying and retransmitting pulses from said craft in response to a challenge, means for receiving said retransmitted pulses, means for applying said received retransmitted pulses to said cathode ray tube for indicating them along a time axis to show which signals are responsive to said challenge by comparing the reflected signal indications and the recognition signal indications, and means for shifting the positions of the first and second pulse indications with respect to each other in the direction of the time axis to correct for displacement introduced by said delay in retransmission.

ARCHIBALD A. JOYNER.

REFERENCES CITED

The following references are of record in the file of this patent:

UNITED STATES PATENTS

| Number | Name | Date |
|---|---|---|
| 2,083,203 | Schlesinger | June 8, 1937 |
| 2,189,549 | Hershberger | Feb. 6, 1940 |
| 2,286,894 | Browne et al. | June 16, 1942 |
| 2,300,189 | Wolff | Oct. 27, 1942 |
| 2,312,203 | Wallace | Feb. 23, 1943 |
| 2,345,932 | Gould | Apr. 4, 1944 |
| 2,364,190 | Burgess | Dec. 5, 1944 |
| 2,407,294 | Shockley et al. | Sept. 10, 1946 |